(12) United States Patent
Luptowski et al.

(10) Patent No.: US 6,993,595 B1
(45) Date of Patent: Jan. 31, 2006

(54) ADDRESS TRANSLATION CHANGE IDENTIFICATION

(75) Inventors: Gregory Luptowski, Richardson, TX (US); Patrick Sollee, Richardson, TX (US); Anita Wadhwani, Dallas, TX (US); Christopher Haun, Richardson, TX (US); Deepashree Rugi, Richardson, TX (US)

(73) Assignee: Nortel Networks Limited, St. Laurent (CA)

( * ) Notice: Subject to any disclaimer, the term of this patent is extended or adjusted under 35 U.S.C. 154(b) by 712 days.

(21) Appl. No.: 10/034,261

(22) Filed: Dec. 28, 2001

(51) Int. Cl.
*G06F 15/16* (2006.01)
*G06F 15/173* (2006.01)
*H04L 12/28* (2006.01)

(52) U.S. Cl. ............... 709/245; 709/227; 709/238; 370/392

(58) Field of Classification Search ......... 709/229, 709/227, 238, 245; 370/392
See application file for complete search history.

(56) References Cited

U.S. PATENT DOCUMENTS

| | | | |
|---|---|---|---|
| 5,856,974 A * | 1/1999 | Gervais et al. | 370/392 |
| 6,535,511 B1 * | 3/2003 | Rao | 370/392 |
| 6,563,824 B1 * | 5/2003 | Bhatia et al. | 370/392 |
| 6,807,184 B2 * | 10/2004 | Gutknecht et al. | 370/401 |
| 2002/0085561 A1 * | 7/2002 | Choi et al. | 370/392 |
| 2002/0116502 A1 * | 8/2002 | Iyer et al. | 709/227 |
| 2002/0116523 A1 * | 8/2002 | Warrier et al. | 709/238 |
| 2002/0138622 A1 * | 9/2002 | Dorenbosch et al. | 709/227 |
| 2003/0055978 A1 * | 3/2003 | Collins | 709/227 |
| 2004/0252683 A1 * | 12/2004 | Kennedy et al. | 370/389 |

* cited by examiner

*Primary Examiner*—John Follansbee
*Assistant Examiner*—Joshua Joo
(74) *Attorney, Agent, or Firm*—Withrow & Terranova, PLLC

(57) ABSTRACT

The present invention allows a client on a private network to determine changes in a public address, which is provided by an address translation device and used for communications on a public network. The client will receive messages over the private network from the public network via the address translation device. In the message, a copy of the public address is placed in a portion of the message. When the address translation device modifies the message such that the client's private address is used for delivery of the message to the client, the copy of the public address remains in the message. Upon receipt, the client will analyze the message to identify the public address and compare the public address with a previously known public address. If the public address provided in the message is different from the stored public address, the client can recognize that it has changed.

22 Claims, 4 Drawing Sheets

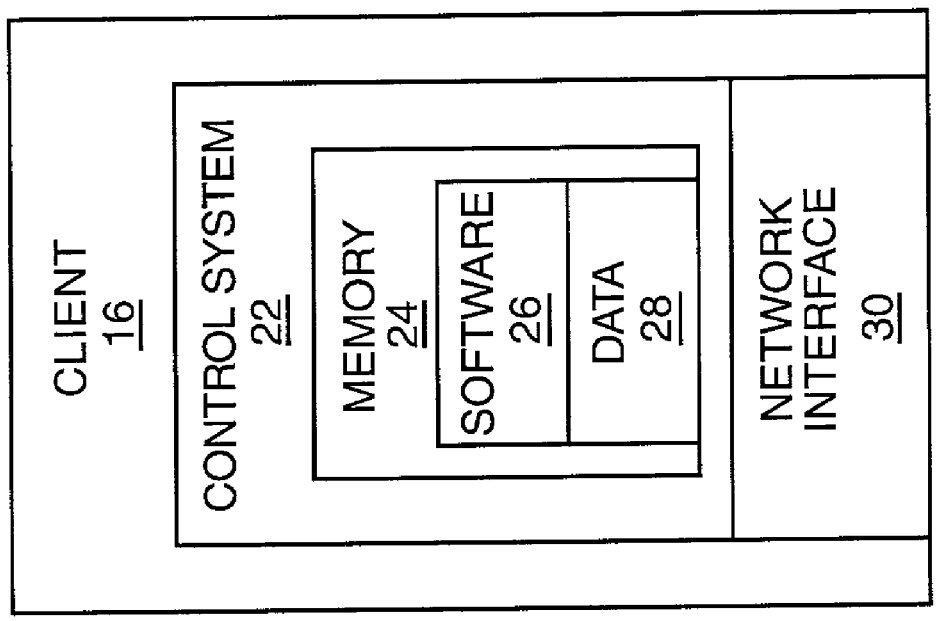

ADDRESS TRANSLATION CHANGE IDENTIFICATION

FIELD OF THE INVENTION

The present invention relates to address translation between private and public networks, and in particular, to a mechanism allowing a client to determine when its associated public address provided by an address translator has changed and act accordingly.

BACKGROUND OF THE INVENTION

Since the current version of the Internet Protocol (IP) only allows for 32 bits of address space, various measures have been taken to preserve the publicly available address space for the Internet. Given the rapid expansion of the Internet, and the limitation of using 32 bits to define an address, certain rules have been defined to reserve a set of numbers guaranteed never to be used on the Internet. These rules are primarily defined in the Internet Engineering Task Force's Request for Comments (RFC) 1918. Essentially, companies and private network providers can each pick from this set of reserved numbers for their private networks. These reserved numbers are only used for addressing within the private networks, and are not used for addressing in a public fashion around the Internet.

Accordingly, there is a need for translations between private IP addresses and public IP addresses at the portals connecting the private and public networks. Although there are various nuances to such address translation, each type of translation can be categorized as network address translation (NAT). To implement NAT, a router, firewall, or like computing device, generally referred to as a translator, will connect the private network to the public network and provide at least two addresses. On the private network side, the translator will have an address from the particular RFC 1918 address range, and on the Internet side, will have a public IP address assigned by the associated Internet Service Provider (ISP).

When a computer on the private network sends a packet aimed at a device on the public network, such as a server, the source IP address, including port, is provided in the packet along with the destination IP address, which may also include a port. When the packet arrives at the translator, the translator will process the packet and send it out over the public network toward the server. Notably, the translator will change the source IP address to the translator's public IP address. The destination IP address will remain the same as that generated by the computer on the private network. The translator will keep track of the association of the source IP address and the public IP address placed in the packet. Therefore, when the server sends a reply packet in response to the transmitted packet, the reply packet is sent to the public IP address associated with the translator. When the translator receives the reply packet, it will quickly associate the public IP address of the packet with the private IP address of the computer and route the reply packet to the computer over the private network.

In essence, the computer represents a client on a private network, and the translator acts as a public interface for clients on the private network. Although the translator provides a private-to-public mapping of IP addresses for each client, the clients are unaware of the translator and the fact that the representative source IP addresses are replaced with public IP addresses prior to routing over the public network. Further, translators typically have a timer associated with each connection. If no packets are delivered in association with the connection after a certain period of time, the translator closes the connection and often ends the mapping for the client associated with the connection. Thus, once the timer expires and the mapping is lost, incoming packets intended for the client may be lost. Mapping may also be lost when the translator is taken off line due to maintenance, an outage, a power failure, or if the mapping expires for some other reason.

Loss of mapping information in a translator is significant because other clients and servers on the public network that communicate with the client store the public address associated with the client. This public address is the errant public address formally provided by the translator and mapped to the client. Although this does not necessary pose a problem for outgoing packets from the client on the private network, devices on the public network will not be able to communicate with the client on the private network until a new mapping is created. A new mapping is typically created when the client on the private network initiates communications with the other devices on the public network. Since the entities on the public network cannot communicate with the client on the private network when the mapping is lost, a significant amount of information may be lost while waiting for the client on the private network to take an action that causes remapping. Accordingly, there is a need for a mechanism to allow clients on the private network to quickly and efficiently determine when the private-to-public mapping provided by the translator has changed.

SUMMARY OF THE INVENTION

The present invention provides a mechanism for a client on a private network to determine changes in a public address, which is provided by an address translation device and used for communications on a public network. In operation, the client will receive messages over the private network from the public network via the address translation device. In the message, the sender will have placed a copy of the public address in a portion of the message known by the client. When the address translation device modifies the message such that the client's private address is used for delivery of the message to the client, the copy of the public address remains in the message. Upon receipt of the message, the client will analyze the message to identify the public address and compare the public address with a previously known public address stored at the client. If the public address provided in the message is different from the stored public address, the client can recognize that it has changed.

In one embodiment, the client will store the new public address received in the message as the stored public address and initiate a message to one or more devices on the public network. Such action will allow these devices to receive the new public address associated with the client. The public address may be an Internet Protocol (IP) address, port, or a combination thereof. In the preferred embodiments, the address translation device effects either a network address translation (NAT) or a network and port translation (NAPT) translation scheme. Although the present invention is applicable with various communication protocols, the Session Initiation Protocol (SIP) is particularly benefited by the present invention. In one embodiment, the replicated public address is stored in the contact header. Implementation of the present invention does not affect the address translation device, but may require devices on the public network to insert a replica of the public address location in the message, which is not removed or otherwise affected by address translation.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 3 is a block representation of a client architecture according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to network address translation (NAT), which is intended to include network address and port translation (NAPT) and the numerous variations thereof. For the purposes of the present disclosure, the term "address" is defined to include an address of a device on a private or public network, such as an IP address. Further, the address may include an associated port; however, for the purposes of description and clarity, the following description may mention a port in association with an address when referring to a particular address in an addressing scheme.

Figure 1:
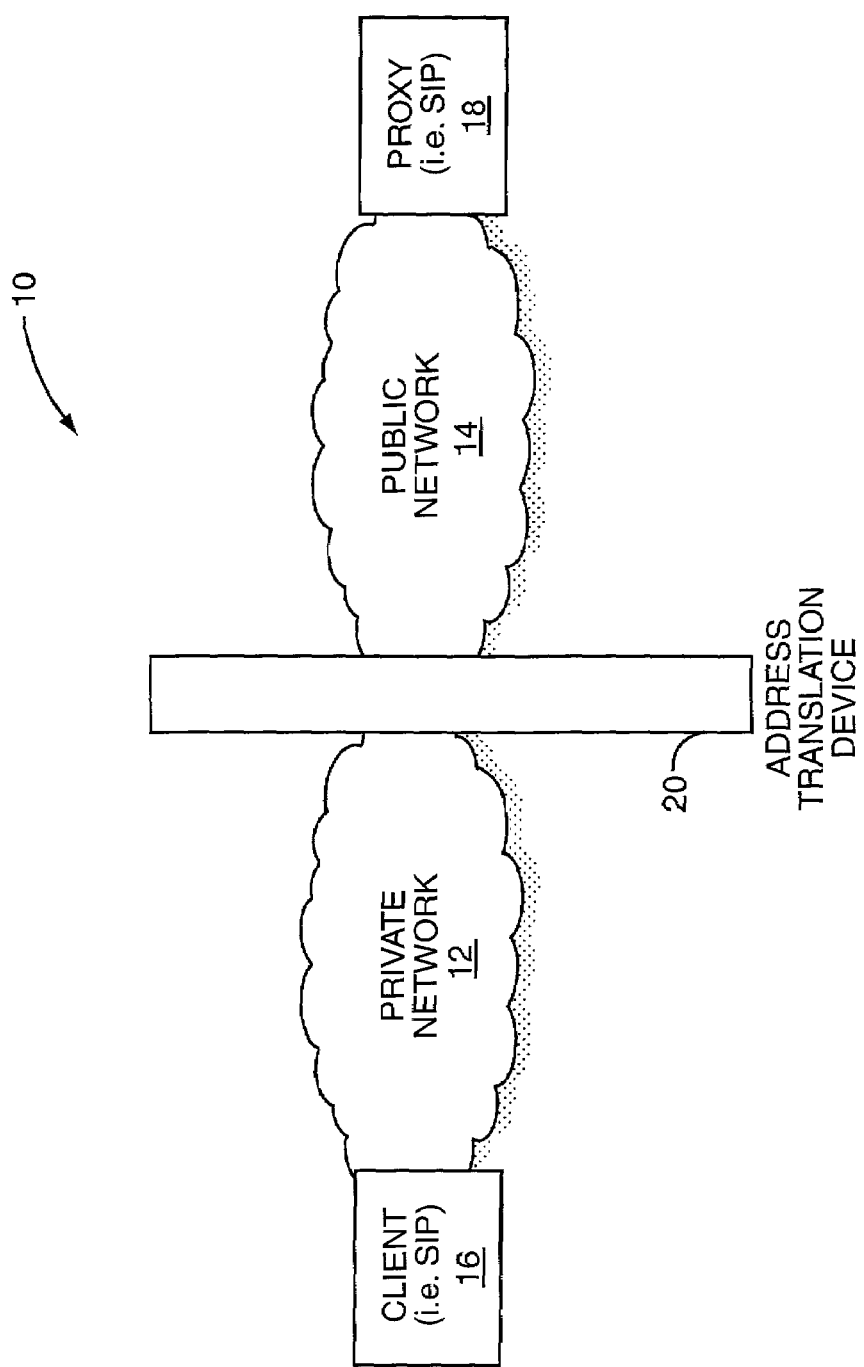
FIG. 1 represents a communication environment having an address translation device providing an interface between private and public networks according to one embodiment of the present invention.

With reference to FIG. 1, a communication environment 10 is illustrated as including a private network 12 and a public network 14, which facilitate the communications between a client 16 and a proxy 18. The client 16 may be a computer or like computing device residing on the private network 12, wherein the proxy 18 may be a proxy server residing on the public network 14. Although the concepts of the present invention are applicable to various communication environments and related protocols, the present invention is preferably implemented using the Session Initiation Protocol (SIP). The specification for SIP is provided in the Internet Engineering Task Force's RFC 2543: Session Initiation Protocol Internet Draft, which is incorporated herein by reference in its entirety.

In general, a SIP network is implemented over one or more networks, including a private network 12 and the public network 14. A SIP proxy, such as may be provided by proxy server 18, may facilitate media sessions between any number of endpoints, which may be provided by the client 16. These endpoints may support any one or combination of data, audio, and voice media sessions, depending on the configuration of the respective endpoints. Although not inclusive, endpoints may take the form of a personal computer (PC), telephone, personal digital assistant (PDA), and the like.

A SIP endpoint is generally capable of running an application, which is referred to as a user agent (UA), capable of facilitating media sessions using SIP. User agents register their ability to establish sessions with a SIP proxy by sending "REGISTER" messages to the SIP proxy. The REGISTER message informs the SIP proxy of the SIP universal resource locator (URL) that identifies the user agent to the SIP network. The REGISTER message also contains information about how to reach specific user agents over the SIP network, by providing the Internet Protocol (IP) address and port that the user agent will use for SIP sessions.

When a user agent wants to establish a session with another user agent, the user agent initiating the session will send an INVITE message to the SIP proxy and specify the targeted user agent in the TO header of the INVITE message. Identification of the user agent takes the form of a SIP URL. In its simplest form, the URL is represented by "<username>@<domain>," such as "janedoe@nortelnetworks.com." The SIP proxy will use the SIP URL in the TO header of the message to determine if the targeted user agent is registered with the SIP proxy. Generally, the user name is unique within the name space of the specified domain.

If the targeted user agent has registered with the SIP proxy, the SIP proxy will forward the INVITE message directly to the targeted user agent. The targeted user agent will respond with a 200 OK message, and a session between the respective user agents will be established as per the message exchange required in the SIP specification. Media capabilities are passed between the two user agents of the respective endpoints as parameters embedded within the session setup messages, such as the INVITE, 200 OK, and acknowledgement (ACK) messages. The media capabilities are typically described using the Session Description Protocol (SDP). Once respective endpoints are in an active session with each other and have determined each other's capabilities, the specified media content may be exchanged during an appropriate media session.

In the communication environment 10 illustrated in FIG. 1, the client 16 is located on a private network 12, and therefore includes a private IP address, which is not addressable over the public network 14. Accordingly, an address translation device 20 will provide a public IP address corresponding to the private IP address associated with the client 16. For outbound packets, the address translation device 20 will replace the private address appearing in the packet header as the source address with the corresponding public IP address, and forward the packet toward its destination IP address, which is not changed by the address translation device 20. Packets originating in the public network 14 and intended for the client 16 in the private network 12 are sent to the public address provided by the address translation device 20.

When the address translation device 20 receives the incoming packet, it will identify the corresponding private address associated with the public address, modify the packet header to replace the public IP address with the corresponding private IP address, and deliver the packet to the client 16 over the private network 12. Unfortunately, existing address translation techniques fail when the mapping between the private IP address and the public IP address for the client 16 is lost. As noted in the SIP environment, it is important for the IP address associated with the client 16 to be properly registered with the proxy 18. When the mapping is lost, packets intended for the client 16 are unable to find the client 16 until the client 16 is properly re-registered with the proxy 18.

The present invention minimizes the impact of lost mapping of the private and public IP address or addresses by providing a mechanism for the client 16 to receive its associated public IP address from incoming packets and detect when the associated public IP address has changed. A change in the public address associated with the client 16 is indicative of a change in mapping provided by the address translation device 20 and triggers the client 16 to take steps to update devices on the public network 14 to inform them of the new public IP address.

Figure 2A:
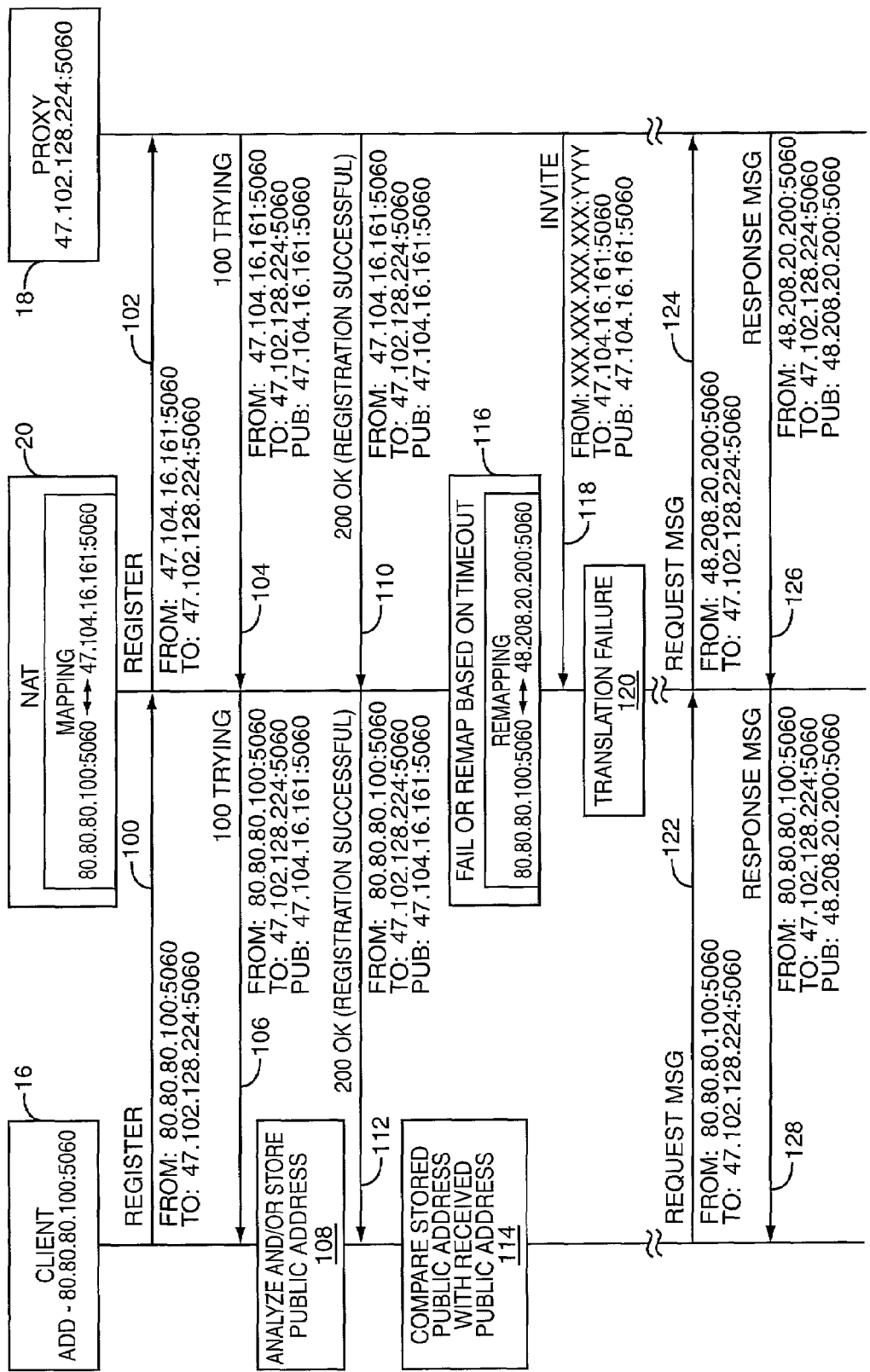
FIGS. 2A and 2B are communication flow diagrams of an exemplary communication flow according to one embodiment of the present invention.
Figure 2B:
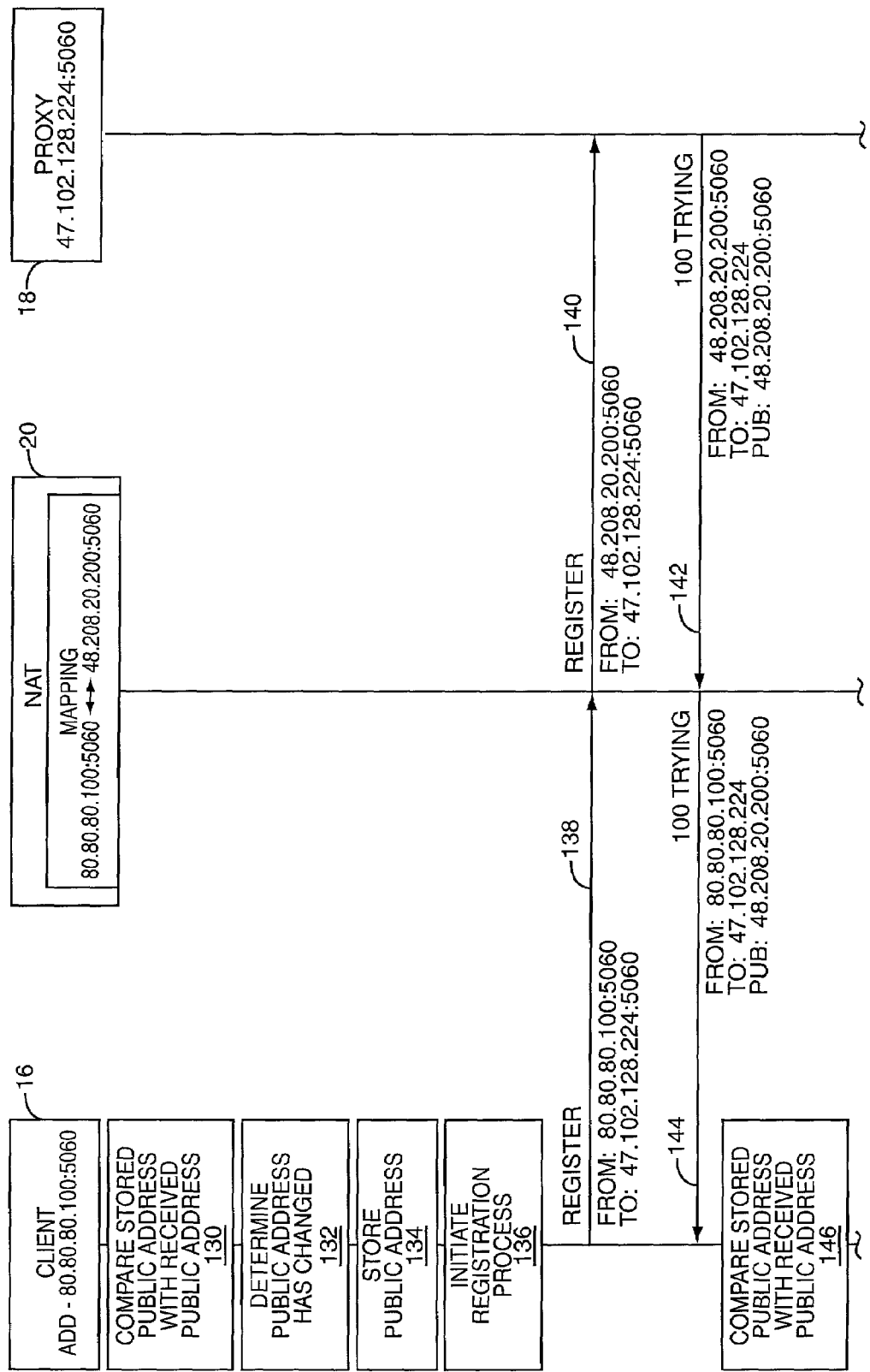

An exemplary scenario is illustrated in the communication flow diagrams of FIGS. 2A and 2B. In the disclosed example, the client 16 is a SIP client having a private address of 80.80.80.100:5060 and the proxy 18 is a SIP proxy having a public IP address of 47.102.128.224. Assume that the address translation device 20 provides an initial mapping of the private address of the client 16 (80.80.80.100:5060 to 47.104.16.161:5060) as shown. Initially, the client 16 will send a SIP REGISTER message to the IP address associated with the proxy 18 (TO: 47.102.128.224) and include the private address of the client 16 (FROM: 80.80.80.100:5060). The REGISTER message is effectively sent to the address translation device 20 (step 100), which identifies or selects a public IP address (FROM: 47.104.16.161:5060) to replace the private IP address of the client 16. The REGISTER message is then sent to the proxy 18 (step 102). In response, the proxy 18 will send a 100 TRYING message intended for the client 16, but using the public address provided by the address translation device 20 (step 104).

In order to allow the client 16 to identify the public IP address provided by the address translation device 20, the proxy 18 will replicate the public IP address associated with the client 16 in a defined part of a packet header associated with the 100 TRYING message. When the address translation device 20 receives the 100 TRYING message from the proxy 18, it replaces the source IP address (FROM: 47.104.16.161:5060) with the private address (FROM: 80.80.80.100:5060) of the client 16. Notably, the "source" address for the 100 TRYING message actually identifies the destination for the message, which is in effect a reply to the REGISTER message. Accordingly, the source and destination portions of the header in a reply message for SIP are the same as those in the message initiating the reply.

Once the public IP address is replaced with the private IP address, the address translation device 20 sends a 100 TRYING message to the client 16 over the private network 12 (step 106). Notably, the portion of the header including the duplicated public IP address remains intact and is analyzed by the client 16, which stores its associated public address in memory if a public IP address is not available, or if the one received is different from that stored (step 108).

Meanwhile, the proxy 18 is registering the client 16 in response to the initial REGISTER message. Once registration is complete, a 200 REGISTRATION SUCCESSFUL message is sent to the client 16 via the address translation device 20 (steps 110 and 112). Again, the public IP address associated with the client 16 is replicated in the packet header associated with the message, and the address translation device 20 will replace the public IP address with the private IP address associated with the client 16 to facilitate transport across the private network 12. Once the 200 REGISTRATION SUCCESSFUL message is received, the client 16 will analyze the public IP address provided in the message and compare it to that stored from the most recent message (step 114). In this example, the public IP address has not changed, and no further action is taken.

In the meantime, assume that the address translation device 20 has failed or has effected a remapping due to a connection timing out, maintenance, or the like. Also, assume that the original mapping defined above is no longer applicable or available (step 116). If another device attempts to deliver a message to the client 16, such as an INVITE to initiate a media session, the message will likely be addressed to the previous public address, 47.104.16.161:5060. The INVITE message will be passed through the proxy 18 to the NAT (step 118), which no longer associates the public address previously used to identify the client 16 (47.104.16.161:5060) with the client's private address 80.80.80.100:5060. Accordingly, there is a translation failure, which results in the INVITE message being dropped or delivered to the wrong client 16 on the private network 12 (step 120).

Next, assume that some type of REQUEST message must be sent from the client 16 to the proxy 18, wherein the private address remains 80.80.80.100:5060 for the client 16 and the IP address for the proxy 18 remains 47.102.128.224. Accordingly, the REQUEST message is sent to the address translation device 20 (step 122), which will identify the private address associated with the client 16 and remap the private IP address (80.80.80.100:5060) to a new public IP address (48.208.20.200:5060).

The address translation device 20 will include the new IP address in the REQUEST message and forward it toward the proxy 18 (step 124). In response, the proxy 18 will reply with a RESPONSE message, which not only includes the public IP address associated with the client 16 as the source IP address, but will also replicate the public IP address somewhere else in a packet header of the RESPONSE message. The proxy 18 will send the RESPONSE message to the address translation device 20 (step 126). Accordingly, the address translation device 20 will swap the public IP address provided as the source address with the private IP address associated with the client 16 and forward the RESPONSE message to the client 16 (step 128). The client 16 will compare the stored public IP address with the public IP address received in the RESPONSE message (step 130) and determine that the public address has changed from 47.104.16.161:5060 to 48.208.20.200:5060 (step 132). The client 16 will then store the new public address (step 134) and initiate a new registration process (step 136).

As described above, a SIP REGISTER message is sent to the proxy 18 via the address translation device 20 (steps 138 and 140), which will initiate a 100 TRYING message back to the client 16 via the address translation device 20 (steps 142 and 144). Again, the public IP address is replicated in a portion of the message surviving address translation by the address translation device 20 and known to the client 16, which will again compare the stored public IP address with the public IP address received in the 100 TRYING message (step 146). The process will continue wherein the client 16 is routinely deriving the public IP address from incoming messages, and comparing the derived public IP addresses with the most recently known public IP address. If there is a discrepancy in the received and most recently known public IP addresses, the received public IP address is stored, and the client 16 will initiate a registration or alerting process calculated to provide the new public IP address to devices on the public network 14 that need such information.

Although the above example focuses on a SIP session with the client 16 and proxy 18, messages may come from any number of devices into the client 16 and include a public address. Thus, the device sending a message to the client 16 bears little consequence in the functionality provided to the client 16 by the present invention. Further, the client 16 does not necessarily have to be a SIP client, but may take the form of any client 16 that benefits from detecting changes in associated public addresses, which are created by address translation devices 20.

In a SIP environment, the replicated public address may be placed in the contact header of a SIP message. For an NAPT environment, the port may be appended to the end of a domain name or URL. For either NAT or NAPT environments, the address may be included in the "MADDR=PARM" field. Those skilled in the art will recognize various possible locations and placements of the information such that the information is not lost or otherwise removed during address translation and is readily available and accessible by the client 16 upon receipt of the message from the address translation device 20 via the private network 12.

As noted above, addresses may include a traditional IP address, alone or in combination with a designated port. Further, the private and public IP addresses may vary only in port number and maintain an identical IP address. Those skilled in the art will recognize the various addressing techniques and the benefits of allowing a client on a private network to identify and react to address translation changes.

The client 16, regardless of being a SIP client or other type, may be implemented in various types of computation devices. As illustrated in FIG. 3, the client 16 will typically be embodied in association with a control system 22 having sufficient memory 24 to provide the necessary software 26 and data 28 to facilitate the functionality described above. The control system 22 is further associated with a network interface 30 providing packet-switched communications with the private network 12.

Those skilled in the art will recognize improvements and modifications to the preferred embodiments of the present invention. All such improvements and modifications are considered within the scope of the concepts disclosed herein and the claims that follow.

What is claimed is:

1. A method for identifying a change in a public address for a client on a private network, wherein the client has a private address on the private network that is associated with the public address by an address translation device to facilitate communications on a public network, the method comprising:
   a) receiving a message over the private network from the public network via the address translation device, the message having the public address of the client as provided by the address translation device;
   b) identifying the public address from the message received over the private network;
   c) comparing the public address with a stored public address representing a previously identified public address; and
   d) determining if the public address is different than the stored public address.

2. The method of claim 1 further storing the public address from the message received over the private network as the stored public address.

3. The method of claim 2 further comprising initiating a message to at least one device on the public network to allow the at least one device to obtain the public address associated with the client and provided by the address translation device.

4. The method of claim 1 further comprising initiating a message to at least one device on the public network to allow the at least one device to obtain the public address associated with the client and provided by the address translation device.

5. The method of claim 1 further comprising:
   a) replicating the public address for the client in the message at a device on the public network; and
   b) over the public network, sending the message to the public address, which corresponds to an address of the address translation device on the public network.

6. The method of claim 1 wherein the client communicates using session initiation protocol, SIP.

7. The method of claim 6 wherein the public address is stored in a contact header of the message.

8. The method of claim 1 wherein the public address includes an Internet Protocol (IP) address.

9. The method of claim 1 wherein the public dress includes a port address.

10. The method of claim 1 wherein the public address includes an Internet Protocol address and a port address.

11. The method of claim 1 wherein the pubic address was generated according to Network Address Translation (NAT).

12. The method of claim 1 wherein the pubic address was generated according to Network Address and Port Translation (NAPT).

13. A client capable of identifying a change in a public address on a private network, wherein the client has a private address on the private network and is associated with the public address by an address translation device to facilitate communications on a public network, the client comprising:
   a) an interface adapted to facilitate communications via the private network;
   b) a control system associated with the interface and adapted to:
      i) receive a message over the private network from the public network via the address translation device, the message having the public address of the client as provided by the address translation device;
      ii) identify the public address from the message received over the private network;
      iii) compare the public address with a stored public address representing a previously identified public address; and
      iv) determine if the public address is different than the stored public address.

14. The client of claim 13 wherein the control system is further adapted to store the public address from the message received over the private network as the stored public address.

15. The client of claim 14 wherein the control system is further adapted to initiate a message to at least one device on the public network to allow the at least one device to obtain the public address associated with the client and provided by the address translation device.

16. The client of claim 13 wherein the control system is further adapted to initiate a message to at least one device on the public network to allow the at least one device to obtain the public address associated with the client and provided by the address translation device.

17. A computer readable medium having software providing a client capable of identifying a change in a public address on a private network, wherein the client has a private address on the private network and is associated with the public address by an address translation device to facilitate communications on a public network, the software comprising instructions for a computer to:

a) receive a message over the private network from the public network via the address translation device, the message having the public address of the client as provided by the address translation device;
b) identify the public address from the message received over the private network;
c) compare the public address with a stored public address representing a previously identified public address; and
d) determine if the public address is different than the stored public address.

18. The computer readable medium of claim 17 further comprising instructions to store the public address from the message received over the private network as the stored public address.

19. The computer readable medium of claim 18 further comprising instructions to initiate a message to at least one device on the public network to allow the at least one device to obtain the public address associated with the client and provided by the address translation device.

20. The computer readable medium of claim 17 further comprising instructions to initiate a message to at least one device on the public network to allow the at least one device to obtain the public address associated with the client and provided by the address translation device.

21. The method of claim 1 wherein receiving the message over the private network comprises receiving with the client.

22. The method of claim 1 wherein the message replicates the public address associated with the client before translation by the address translation device.

* * * * *